C. PARDEE.
SHOCK ABSORBER.
APPLICATION FILED AUG. 18, 1919.
1,336,534.
Patented Apr. 13, 1920.
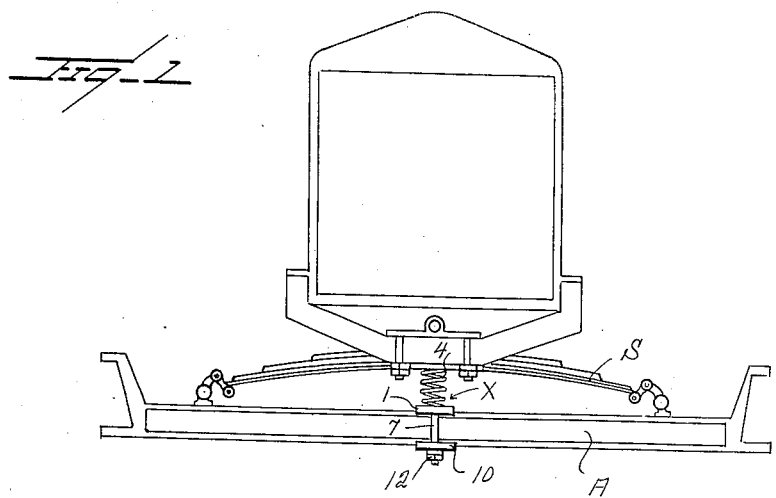
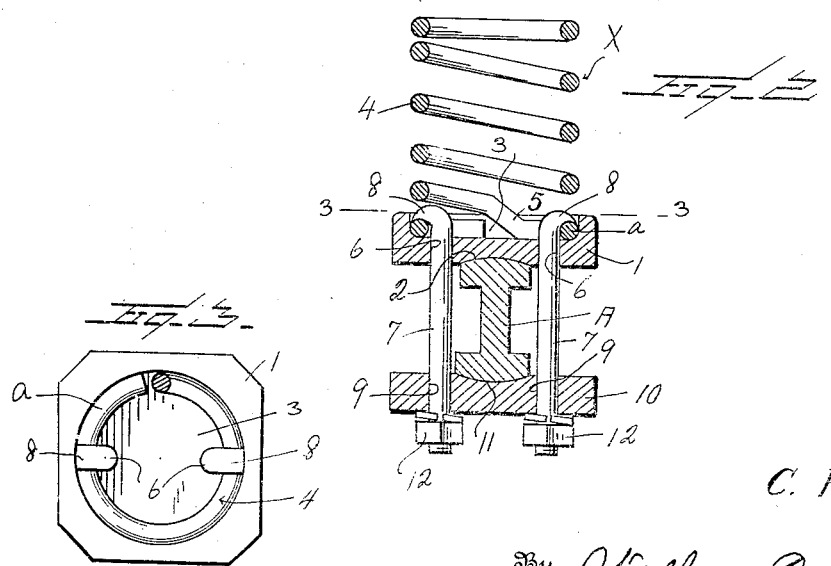
Inventor
C. Pardee
By Wilfred E. Lawson
Attorney

UNITED STATES PATENT OFFICE.

CHARLES PARDEE, OF AUGUSTA, MAINE.

SHOCK-ABSORBER.

1,336,534.  Specification of Letters Patent.  Patented Apr. 13, 1920.

Application filed August 18, 1919. Serial No. 318,224.

*To all whom it may concern:*

Be it known that I, CHARLES PARDEE, a citizen of the United States, residing at Augusta, in the county of Kennebec and State of Maine, have invented certain new and useful Improvements in Shock-Absorbers, of which the following is a specification.

This invention relates to certain improvements in shock absorbers and has relation more particularly to a device of this general character especially designed and adapted for use in connection with an automobile structure of the well known Ford type, and it is an object of the invention to provide a novel and improved shock absorber adapted to be secured to the front axle of an automobile and which coacts with the front spring and in a manner to materially reduce the possibility of such spring breaking.

The invention consists in the details of construction and in the combination and arrangement of the several parts of my improved shock absorber whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a front elevational view showing a shock absorber constructed in accordance with an embodiment of my invention and in applied position.

Fig. 2 is an enlarged vertical sectional view with parts in elevation of my improved absorber as herein embodied and in applied position, the coacting front spring being omitted.

Fig. 3 is a sectional view taken substantially on the line 3—3 of Fig. 2, with the coacting axle omitted.

As disclosed in the accompanying drawings, A denotes the front axle of an automobile or the like and S denotes a front spring coacting therewith.

Interposed between the axle A and the spring S is the shock absorber X constructed in accordance with an embodiment of my invention and which absorber in addition to compensating for the shocks and jars incident to travel also operates to materially reduce the possibility of the front spring S breaking and also, in the event of such spring S breaking, to hold the body from dropping down, so that it is not necessary to tow in the car for the purpose of repair.

In the present embodiment of my invention, my improved absorber comprises a plate 1 adapted to be superimposed upon the axle A and which is provided in its under face with a groove or channel 2 extending thereacross and which receives the upper portion of the axle. The upper face of the plate 1 is provided with a socket 3 in which seats the lower end portion of a vertically disposed helical spring 4 of desired tension and of a length to have its upper end substantially contact with the under face of the spring S.

In order to assure the requisite seating of the spring 4 within the socket 3 the lower or bottom convolution $a$ of said spring is flat with the portion of the strand from which the spring is produced adjacent the second convolution upwardly offset as at 5. By this means the spring 4 effectively seats within the socket 3 without placing the spring 4 under compression. The base portion of the socket 3 at diametrically opposed points is provided with the openings 6 through which are directed the elongated shank 7. The upper end portion of each of the shanks 7 is provided with an outwardly directed and downwardly facing hook member 8 which engages over the convolution $a$ of the spring 4 whereby the spring 4 is securely held to the plate 1 as will hereinafter be fully explained. The lower end portions of each of the shanks 7 extend through an opening 9 in an end portion of a second plate 10 underlying the axle A. The upper face of the plate 10 is provided thereacross with the groove or channel 11 to receive the lower portion of the axle A.

In threaded engagement with each of the shanks 7 below the plate 10 is a nut 12 or the like whereby my improved absorber is effectively anchored to the axle A and the spring 4 securely held by the plate 1.

It is to be particularly noted that my improved shock absorber comprises but a few parts and that the various parts can be readily assembled with convenience and facility as is also true of the applying or removing of the device with respect to the axle A.

From the foregoing description, it is thought to be obvious that a shock absorber constructed in accordance with my invention is particularly well adapted for use by reason of the convenience and facility with which it may be assembled and operated and it will also be obvious that my invention is susceptible of some change and modification without departing from the spirit and principles thereof and for this reason I do not wish to be understood as limiting myself to the precise arrangement and formation of the several parts herein shown in carrying out my invention in practice except as hereinafter claimed.

I claim:

1. A shock absorber adapted to be interposed between a member and a spring and comprising a plate, a face of said plate being provided with a socket, a compression member having an end portion seated within said socket and of a length to substantially constantly engage the spring, shanks disposed through the plate and provided with hook members engaging the compression member, and clamping means coacting with the shank for holding the same to the first named member and for holding the compression member within the socket of the plate.

2. A shock absorber adapted to be interposed between a member and a spring and comprising a plate, a face of said plate being provided with a socket, a compression member having an end portion seated within said socket and of a length to substantially constantly engage the spring, shanks disposed through the plate and provided with hook members engaging the compression member, and clamping means coacting with the shank for holding the same to the first named member and for holding the compression member within the socket of the plate, said compression member constituting a helical spring.

3. A shock absorber adapted to be interposed between a member and a spring and comprising a plate, a face of said plate being provided with a socket, a compression member having an end portion seated within said socket and of a length to substantially constantly engage the spring, shanks disposed through the plate and provided with hook members engaging the compression member, and clamping means coacting with the shank for holding the same to the first named member and for holding the compression member within the socket of the plate, said compression member constituting a helical spring, the hook members of the shanks engaging over a convolution of the helical spring seating within the socket of the plate.

4. A shock absorber adapted to be interposed between a member and a spring and comprising a plate, a face of said plate being provided with a socket, a compression member having an end portion seated within said socket and of a length to substantially constantly engage the spring, shanks disposed through the plate and provided with hook members engaging the compression member, and clamping means coacting with the shank for holding the compression member within the socket of the plate, said compression member constituting a helical spring, the hook members of the shanks engaging over a convolution of the helical spring seating within the socket of the plate, said convolution being substantially flat.

In testimony whereof I affix my signature.

CHARLES PARDEE.